United States Patent [19]

Nakamura

[11] Patent Number: 4,763,219
[45] Date of Patent: Aug. 9, 1988

[54] OVERLOAD PROTECTION FOR DC MOTOR-DRIVEN LINEAR ACTUATOR

[75] Inventor: Kenichiro Nakamura, Moriyama, Japan

[73] Assignee: Tsubakimoto Chain Co., Osaka, Japan

[21] Appl. No.: 91,827

[22] Filed: Sep. 1, 1987

[30] Foreign Application Priority Data

Nov. 14, 1986 [JP] Japan ............................ 61-174045[U]
Dec. 25, 1986 [JP] Japan ............................ 61-198342[U]

[51] Int. Cl.⁴ .............................................. H02H 5/00
[52] U.S. Cl. ...................................... 361/23; 318/475;
 318/434; 318/266; 192/150; 200/47
[58] Field of Search ..................... 361/23, 51; 318/626,
 318/646, 652, 135, 261, 282, 264–266, 434, 475,
 469, 476; 307/119, 122; 200/47; 192/150

[56] References Cited

U.S. PATENT DOCUMENTS

| | | | |
|---|---|---|---|
| 3,078,407 | 2/1963 | Schaefer | 318/475 |
| 3,435,696 | 4/1969 | Carr | 74/424.8 |
| 3,460,018 | 8/1969 | Cary | 318/475 |
| 3,523,599 | 8/1970 | Denkowski | 192/150 |
| 3,851,538 | 12/1974 | Denkowski et al. | 74/425 |
| 3,968,705 | 7/1976 | Amano et al. | 74/424.8 |

Primary Examiner—A. D. Pellinen
Assistant Examiner—Todd E. DeBoer
Attorney, Agent, or Firm—Howson and Howson

[57] ABSTRACT

A permanent magnet DC motor-driven linear actuator has a screw shaft supported against axial movement by a compressed spring. Excess thrust in one direction causes the shaft to move axially to open a first momentary switch, and excess thrust in the opposite direction similarly opens a second momentary switch. The switches are connected electrically in series with each other and with the motor, and enable the motor to stop whenever a mechanical overload is encountered regardless of the position of the actuator operating rod. Diodes connected across the switches in opposite directions allow reversal of the motor by reversing polarity of the DC supply, even when a switch is held open. In two of the embodiments of the invention, the swithes are double-throw switches, and additional diodes are connected from the normally open contacts of the switches to the opposite terminal of the motor to provide dynamic braking.

2 Claims, 2 Drawing Sheets

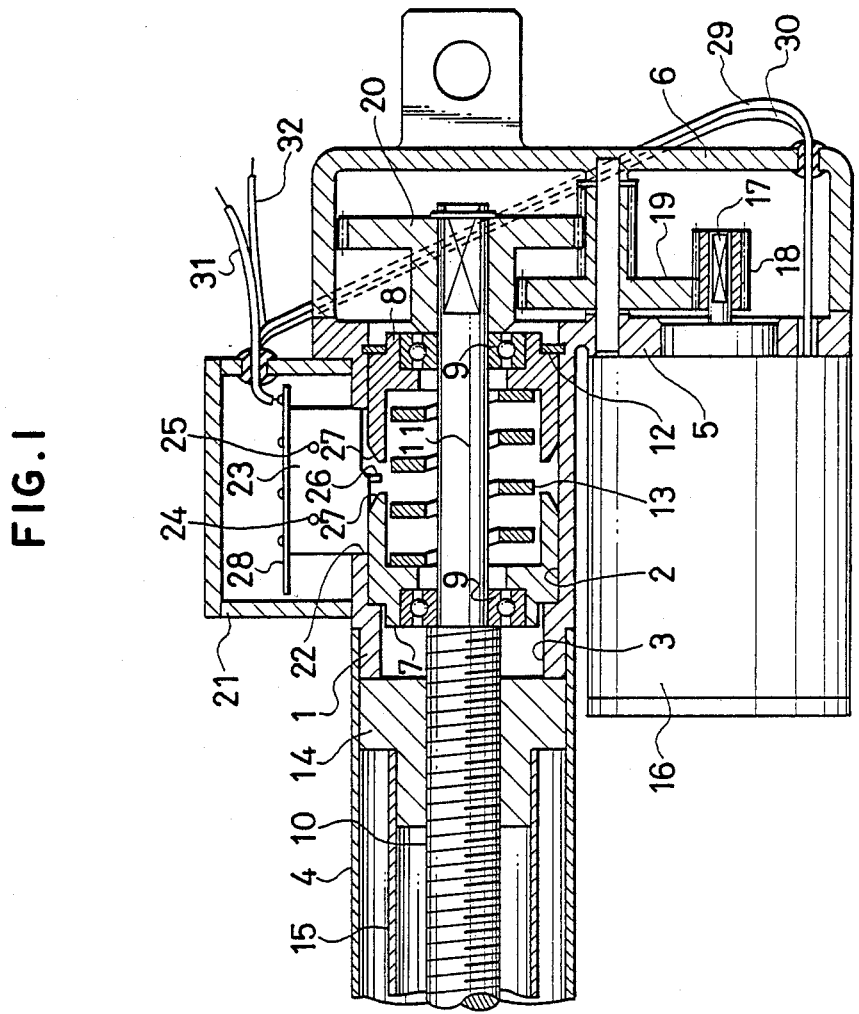

OVERLOAD PROTECTION FOR DC MOTOR-DRIVEN LINEAR ACTUATOR

BRIEF SUMMARY OF THE INVENTION

This invention relates to motor-driven linear actuators in which rotation of a screw shaft driven by a permanent magnet DC motor is translated into linear motion. The invention relates more particularly to an actuator having overload protection means operable at any position of the actuator stroke.

Prior overload protection systems for linear actuators driven by permanent magnet DC motors can be divided into three groups. The first group consists of systems having clutches which trip when an overload condition occurs. The second group consists of systems having limit switches which are actuable at the opposite ends of the actuator stroke. The limit switches are actuated by operating members mounted on a moving part of the actuator or by a cam arranged to rotate through all or part of one revolution as the actuator proceeds through its full stroke. In the third group, a limit switch, arranged to be actuated at the opposite ends of the stroke, cuts off current in the main circuit to the motor and simultaneously inserts a diode in the circuit to provide a temporary path for current in the opposite direction. By reversing the polarity of the applied DC voltage, the actuator motor can be reversed. The diode conducts current to the motor until the limit switch recloses to conduct current for continued rotation of the motor in the reverse direction.

Actuators of the first group, which rely on clutches for overload protection, are structurally complex. Actuators of the second and third groups, which rely on limit switches, provide no overload protection function in the middle of a stroke.

The primary object of the present invention is to eliminate the problems mentioned above, and to provide a simple and reliable means which makes it possible to stop the motor at any position of the stroke upon detection of an overload condition and then reverse the direction of motor rotation by changing the polarity of the power source.

Another object of the invention is to provide a DC motor-driven linear actuator of simple construction in which motor rotation is stopped automatically by dynamic braking, and in which the motor can be reversed when stopped due to an overload condition simply by reversing the polarity of the applied DC voltage.

According to one aspect of the invention, the above-mentioned objects are achieved by the provision of a linear actuator of the type having a screw shaft, driven by a permanent magnet DC motor, and normally held in a predetermined axial position by a compressed spring so that a predetermined axial force on the screw shaft is necessary to cause the shaft to move away from its predetermined position in either direction. The actuator includes a nut threaded on the screw shaft, and an operating rod connected to the nut and movable in the axial direction under guidance of the screw shaft. The actuator further includes a pair of self-resetting (momentary) switches actuable by axial movement of the screw shaft when the thrust applied by the screw shaft exceeds the force necessary to overcome the spring pressure. One switch is actuated when the excessive thrust is in one direction along the axis of the screw shaft, and the other switch is actuated when the excessive force is in the opposite direction. The switches are connected in series with the armature of the DC motor, and diodes are connected across the contacts of the switches in opposite directions so that, after a switch opens as a result of an overload encountered during movement of the actuator, the diode across that switch will conduct current to the motor when polarity of the applied voltage is reversed to effect reversal of the actuator.

If the thrust on the screw shaft exceeds a predetermined value as a result of overloading, one of the switches, which has detected the excessive thrust, is actuated to open the armature circuit, thereby stopping the motor. The position of the screw shaft does not change after the motor stops, and consequently the opened switch remains open. However, when the polarity of the applied voltage is reversed to move the screw shaft in the opposite direction, the diode connected across the open switch conducts current to the armature, allowing the motor to rotate in the reverse direction. The switch recloses as soon as the excess thrust is relieved at which time current is again conducted to the armature through both switches.

According to another aspect of the present invention, the linear actuator includes a pair of self-resetting, double-throw change-over switches. These switches are actuable when the thrust on the operating rod exceeds the predetermined spring pressure. The switches are connected in series between the armature of the motor and terminals of the power source in such a manner that the common contact of each of the switches is electrically connected on the armature side of the switch. On each switch, a diode is connected between the common contact and the normally closed contact. These switch by-passing diodes on the respective switches are connected in opposite directions in the series circuit. As described so far, the circuit is electrically identical to the circuit using simple single-throw (momentary) switches. However, each of the switches has an additional diode connected between its normally open contact and the terminal of the armature which is electrically remote from the switch. The second diodes are connected in directions such as to conduct current generated in the armature in order to effect dynamic braking when a switch is actuated.

In this second aspect of the invention, the two change-over switches normally close the armature circuit. Therefore the motor rotates in a direction determined by the polarity of the power source. In this instance, one of the switch by-passing diodes is in the forward direction while the other one is in the reverse direction, and the additional diodes are disconnected from the motor circuit. When the thrust of the screw shaft exceeds the predetermined spring pressure due to overloading, the change-over switch which has detected the excessive thrust is actuated to open the armature circuit. Simultaneously one of the additional diodes is connected across the armature in a direction to conduct current generated in the armature as the motor continues to rotate. This diode, in effect, short circuits the armature through a low resistance, and causes the armature to be stopped quickly by dynamic braking. The position of the screw shaft does not change after the motor stops, and consequently the switch which was actuated by the overload condition remains actuated. However, the motor can be reversed by reversing the polarity of the supply.

BRIEF DESCRIPTION OF THE DRAWINGS

FIG. 1 is a fragmentary vertical section through the major components of an actuator;

FIG. 1A is an enlarged fragmentary view of an operating member of a switch box shown in FIG. 1;

DETAILED DESCRIPTION

Figure 4:
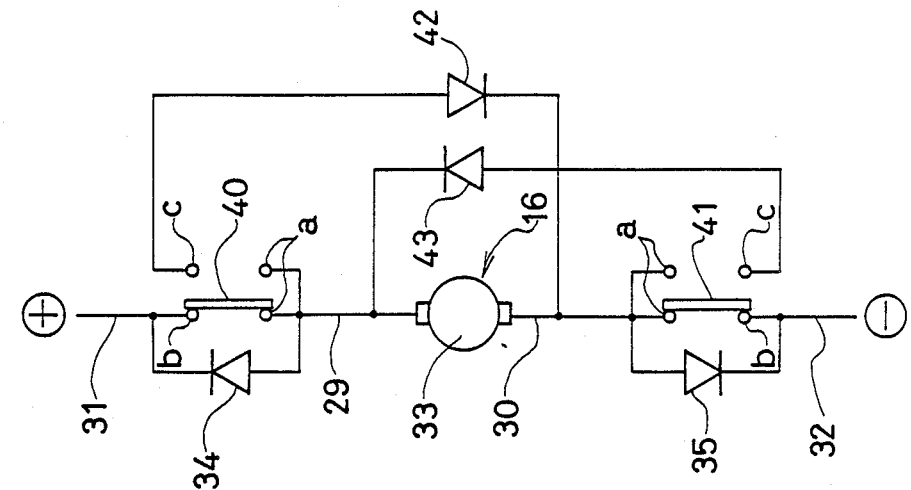
FIG. 4 is an electrical schematic of a third embodiment of the invention.

The linear actuator of FIG. 1 has a cylindrical casing 1 with a large diameter bore 2, and a small diameter bore 3 coaxial with, and located at the front end of, bore 3. An outer sleeve 4 is fixed to the front side of casing 1, and a cover 6 is fixed to a flange 5 on the rear side of casing 1. Cup-shaped spring seats 7 and 8 are slidably fitted in large diameter bore 2 with open cylindrical end faces opposing each other. A bearing 9 is fitted on the opposite side of each one of the spring seats 7 and 8. The bearings 9 support a cylindrical shank portion 11 of a screw shaft 10. The front spring seat 7 abuts the annular face formed where the small diameter bore 3 meets the large diameter bore 2. The rear spring seat 8 is stopped by a stop ring 12. A coiled compression spring 13, when inserted between the two spring seats 7 and 8, is preloaded to a predetermined stress.

Nut 14 is threaded onto screw shaft 10 at a position forward of the shank portion 11 (left side in FIG. 1), and a hollow cylindrical operating rod 15 is fixed to nut 14. A suitable conventional spline (not shown) prevents rotation of nut 14 and rod 15 relative to the outer sleeve 4. The rear end of the shank portion 11 is coupled with output shaft 17 of motor 16 through a train of gears 18, 19 and 20 located within cover 6. A switch box 23 is mounted in a case 21 which is fixed on casing 1, in face-to-face relation with a window opening 22 formed in casing 1. Switch box 23 contains a pair of self-resetting switches 24 and 25. An operating member 26, common to both switches, protrudes into the window opening 22 such that it can be tilted rightward or leftward by engagement with an inclined surface 27, formed on each one of the opposing ends of the spring seats 7 and 8, to selectively actuate the switches 24 and 25. A printed circuit board 28 is mounted on top of the switch box 23. Indicated at 29 and 30 are motor lead wires, and at 31 and 32 are power supply lines.

Figure 2:
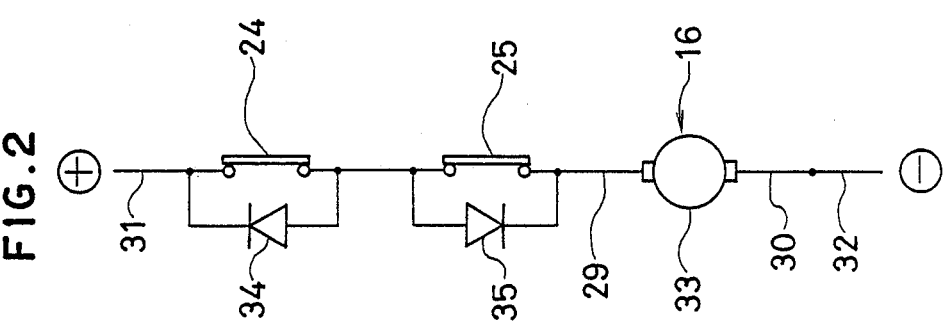
FIG. 2 is an electrical schematic of a first embodiment of the invention.

FIG. 2 shows one embodiment in which switches 24 and 25 are simple, self-resetting on-off switches connected in series with armature 33 of a permanent magnet DC motor 16. Diodes 34 and 35 are connected in opposite directions across the contacts of the respective switches 24 and 25. The diodes and connections are provided on printed circuit board 28 (FIG. 1) which is housed in case 21 for protection.

If current is conducted to armature 33 with wire 31 positive as indicated, operating rod 15 is advanced (to the left in FIG. 1). If operating rod 15 encounters an excessive load, the thrust imposed on the operating rod is transmitted to spring 13 through spring seat 7. As soon as the thrust exceeds the predetermined pressure of the spring 13, spring seat 7 is retracted, and, when the thrust reaches a predetermined overload value, the inclined surface 27 of spring seat 7 actuates operating member 26 to open switch 24. As a result, armature 33 is disconnected from the power source and stopped. Since nut 14 cannot be retracted by the pressure of spring 13 after the actuator stops, switch 24 remains open.

If the polarity of the applied voltage is reversed so that wire 31 is negative, diode 34 conducts current to rotate armature 33 in the reverse direction. As a result, operating rod 15 is retracted (moved rightward in FIG. 1), and spring seat 7 is pushed forward by the pressure of spring 13, automatically returning switch operating member 26 to its original condition to close switch 24.

If an overload condition takes place during retraction of operating rod 15, spring seat 8 is advanced to tilt operating member 26 in the opposite direction, thereby opening switch 25 to stop rotation of armature 33. Diode 35 allows the actuator to be reversed by changing the polarity of the supply.

Figure 3:
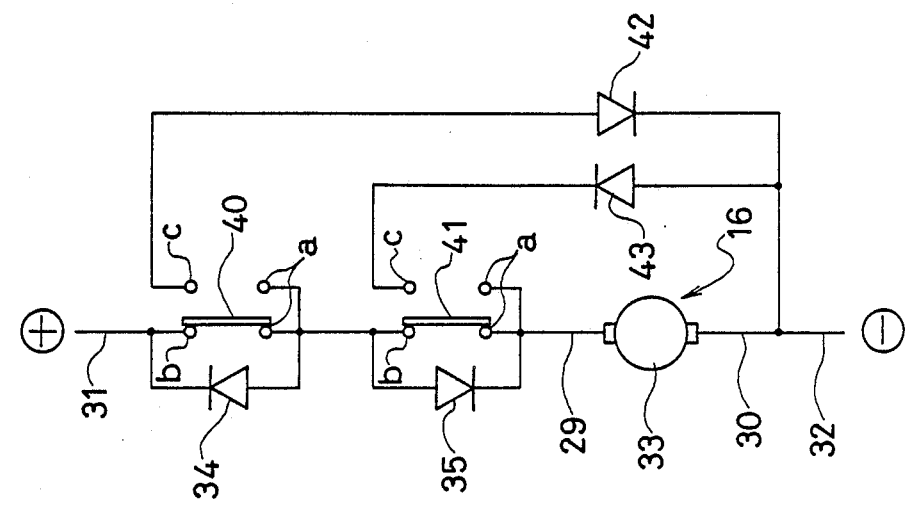
FIG. 3 is an electrical schematic of a second embodiment of the invention.

FIGS. 3 and 4 show further embodiments of the invention, in which the operating rod 15 is stopped more quickly than in the embodiment of FIG. 2. In this case, the self-resetting change-over switches 24 and 25 in the embodiment of FIG. 2 are replaced by double-throw self-resetting change-over switches 40 and 41, and additional diodes 42 and 43 are provided to effect dynamic braking.

In FIG. 3, change-over switches 40 and 41 are connected in series with armature 33 of the motor 16 so that the common contact a of each switch is electrically on the side of the switch nearest armature 33. First and second diodes 34 and 35 are connected in opposite directions across normally closed contacts a and b of the respective switches. Third and fourth diodes 42 and 43, for passing dynamic braking current, are connected from normally open contacts c to the opposite terminal of the armature at wire 30. The third and fourth diodes 42 and 43 are connected in opposite directions relative to first and second diodes 34 or 35 so that, when either of the change-over switches is actuated, the two diodes associated with that switch are electrically connected back-to-back. All four diodes, and the interconnections of the diodes with the switches, are provided on the printed circuit board 28, which is housed in the case 21 for protection.

In operation of the embodiment of FIG. 3, when current is supplied and wire 31 is positive, operating rod 15 is advanced. The thrust load imposed on the operating rod 15 is applied to spring 13 through spring seat 7. If the thrust load exceeds the predetermined stress of spring 13, the spring seat 7 is retracted. When the thrust load reaches a predetermined overload value, the inclined surface 27 on spring seat 7 actuates operating member 26 to operate change-over switch 40 so that contacts a and c of switch 40 are connected and contacts a and b are disconnected. As a result, the armature is disconnected from the power source, and quickly stopped by dynamic braking current which is generated by its inertial rotation and conducted by the diode 42. Since nut 14 cannot retract after the armature stops, switch 40 remains in this switched position.

When the polarity of the supply is reversed, wire 31 is negative. Diode 34 then conducts current to rotate armature 33 in the reverse direction. As a result, operating rod 15 is retracted, and spring seat 7 is moved forward by the pressure of the spring 13, automatically returning operating member 26 to its initial position.

In case an overload condition takes place during retraction of operating rod 15, spring seat 8 is advanced to tilt operating member 26 in the opposite direction, thereby changing the position of change-over switch 41 to stop rotation of armature 33 and passing the generated current through diode 43.

The use of diodes 42 and 43 in the circuit of FIG. 3 instead of simple conducting wires prevents a short circuit of the power supply from occurring upon an attempt to reverse the motor by changing polarity of the supply voltage.

The embodiment of FIG. 4 is substantially the same as the one shown in FIG. 3 except that, in the case of FIG. 4, the switches are electrically on opposite sides of the motor armature.

In the embodiment of FIG. 4, change-over switches 40 and 41 are connected in series with the armature 33 of the motor 16, and common contact a of each switch is directly connected to armature 33. The first and second diodes 34 and 35 are connected in opposite directions across the normally closed contacts a and b of the switches. Each of the third and fourth diodes 42 and 43, for conducting the generated current, is connected from the normally open contact c of its associated switch to the opposite terminal of armature 33. Here again, diodes 34 and 42 are electrically connected back-to-back when switch 40 is actuated and diodes 35 and 43 are connected back-to-back when switch 41 is actuated.

The operation of the circuit of FIG. 4 is the same as in the embodiment of FIG. 3.

With the present invention in any of the above-described arrangements, the operating rod can be moved back and forth simply by reversing the polarity of the power source. Protection against overload caused by a collision either at the end of a stroke, or at any position in a stroke, is achieved by means of a compact control circuit which is built into the linear actuator. Therefore, the actuator is very convenient to handle, and safe to operate even when an operator forgets to cut off the power source after a stop. On restarting the actuator, the operating rod can be moved forward or backward according to the polarity of the power source. The embodiments of FIGS. 3 and 4 also have the advantage of quick stopping when overload conditions are encountered as a result of the provision of additional diodes to conduct dynamic braking current. The advantage of dynamic braking is achieved without interfering with the operation of the reversing diodes.

I claim:

1. A DC motor-driven linear actuator comprising a permanent magnet DC motor having a pair of electrical terminals for connection to an electrical power source, a screw shaft connected to be rotated by said motor, a nut threaded on the screw shaft, an operating rod connected to the nut, bearing means for supporting the screw shaft for rotation on an axis, spring means held under a predetermined stress for normally maintaining the bearing means and screw shaft in a fixed axial position, and allowing the bearing means and screw shaft to move axially in either direction when the thrust of the operating rod exceeds the predetermined stress of the spring means, first and second self-resetting switches having normally closed contacts connected in series with each other and with the electrical terminals of the motor to conduct DC current from an electrical power source to the motor, actuator means for the switches, means connected to the screw shaft for operating the actuator means so that normally closed contacts of the first switch are opened when the screw shaft moves in a first axial direction and so that the normally closed contacts of the second switch open when the screw shaft moves in the opposite axial direction, a first diode connected across the normally closed contacts of the first switch in a direction to block current from the supply toward the motor when the motor is operating in a direction such that an excessive thrust on the operating rod would cause the normally closed contact of the first switch to open, and a second diode connected across the normally closed contacts of the second switch in a direction to block current from the supply toward the motor when the motor is operating in a direction such that an excessive thrust on the operating rod would cause the normally closed contacts of the second switch to open.

2. A DC motor-driven linear actuator according to claim 1 in which each of the switches is a double-throw change-over switch having a common contact and first and second contacts alternately connectable to the common contact, in which said normally closed contact of each switch are the common contact and the first contact, and in which the common contact of each of the switches is electrically on the side of the switch nearest the terminal of the motor to which the switch is connected, and having a third diode connected from the second contact of the first switch to the terminal of the motor opposite to the motor terminal to which the first switch is connected, and a fourth diode connected from the second contact of the second switch to the terminal of the motor opposite to the motor terminal to which the second switch is connected, said third diode being arranged so that it is electrically back-to-back with the first diode when the first switch is actuated to connect its common contact to its second contact, and said fourth diode being arranged so that it is electrically back-to-back with the second diode when the second switch is actuated to connect its common contact to its second contact.

* * * * *